April 2, 1957 W. J. WITWER 2,787,105
MOUNTING FOR RIGID DISK ASSEMBLY
Filed May 4, 1954 3 Sheets-Sheet 2

INVENTOR.
WALLACE J. WITWER
BY
ATTORNEYS.

April 2, 1957  W. J. WITWER  2,787,105
MOUNTING FOR RIGID DISK ASSEMBLY
Filed May 4, 1954  3 Sheets-Sheet 3

INVENTOR.
WALLACE J. WITWER
BY
ATTORNEYS.

United States Patent Office 2,787,105
Patented Apr. 2, 1957

2,787,105

MOUNTING FOR RIGID DISK ASSEMBLY

Wallace J. Witwer, Galion, Ohio, assignor to The Cobey Corporation, Galion, Ohio, a corporation of Ohio Application May 4, 1954, Serial No. 427,555

8 Claims. (Cl. 55—73)

The present invention relates generally to disk plows and harrows used for soil treatment in farming operations, and more particularly to the mounting of a rigid disk assembly.

It is a well known practice in agricultural operations to employ disk plows and disk harrows for breaking and turning soil. Devices for this purpose are well known in the prior art and normally consist of gangs of horizontally-spaced disks which are mounted in a frame structure and drawn across the soil by horse or tractor. The gangs are mounted so as to have comparatively free vertical movement relatively to each other and remain in constant engagement with the ground.

It is also customary for devices of this nature to have four gangs of disks arranged in sets of two gangs each suitably angled relatively to each other. These devices are generally referred to as flexible disk plows.

Further development and improvement in disk plows has resulted in heavier frame assemblies which are mounted on wheels which can be raised or lowered to cause engagement or disengagement of the disks with the ground. In these devices the gangs of disks are rigidly secured to the frame and have no free movement relatively to the frame or to each other. Devices of this type are therefore designated rigid disks in contrast to the flexible disks heretofore described.

Raising and lowering of the wheels in rigid disk devices is customarily accomplished by a hydraulic cylinder which is mounted on top of the frame.

Inasmuch as the depth of penetration of the disks is governed by their angularity to their direction of travel, it is desirable that the angularity be variable. For this reason gangs of rigid disks are generally not welded to the frame structure, but are rigidly secured by nuts and bolts so that angularity of the gangs can be changed when necessary.

Although the rigid disk has many advantages over the flexible disk, one serious drawback to its use lies in the fact that the rigidity of the disk mounting causes the device to be very susceptible to breakage as there is no "give" in the structure. This results in breakage of the disk blades, the spindle bolts, or the gang frame structure when the device is jarred by heavy rocks or similar obstructions in the soil.

It is a primary object of my invention to provide a floating mounting for rigid disks, which mounting will yield when the disk plow encounters an obstruction, thereby avoiding unnecessary breakage of the kind above described.

Another object of my invention is to provide a rigid disk plow having means for effecting angular adjustment of the gangs quickly without the use of tools.

Still another object of my invention is to provide a device of the character described in which the hydraulic cylinder is mounted below the level of the frame so as to provide a substantially unobstructed flat area which can be utilized for mounting a wagon body or the like.

A further object of my invention is to provide a mounting structure of the character described which is adaptable to a variety of agricultural uses.

Another object of my invention is to provide a disk gang structure which is designed for maximum efficiency in tillage operations.

Other objects and advantages of my invention will be apparent during the course of the following description. In the accompanying drawings forming a part of this specification and in which like numerals are employed to designate like parts throughout the same, Fig. 1 is a plan view of a rigid disk plow embodying the features of my invention;

Fig. 3 is a fragmentary side elevation of a portion of the plow taken as indicated by line 3—3 of Fig. 1, showing details of the elevating mechanism;

Figure 1:
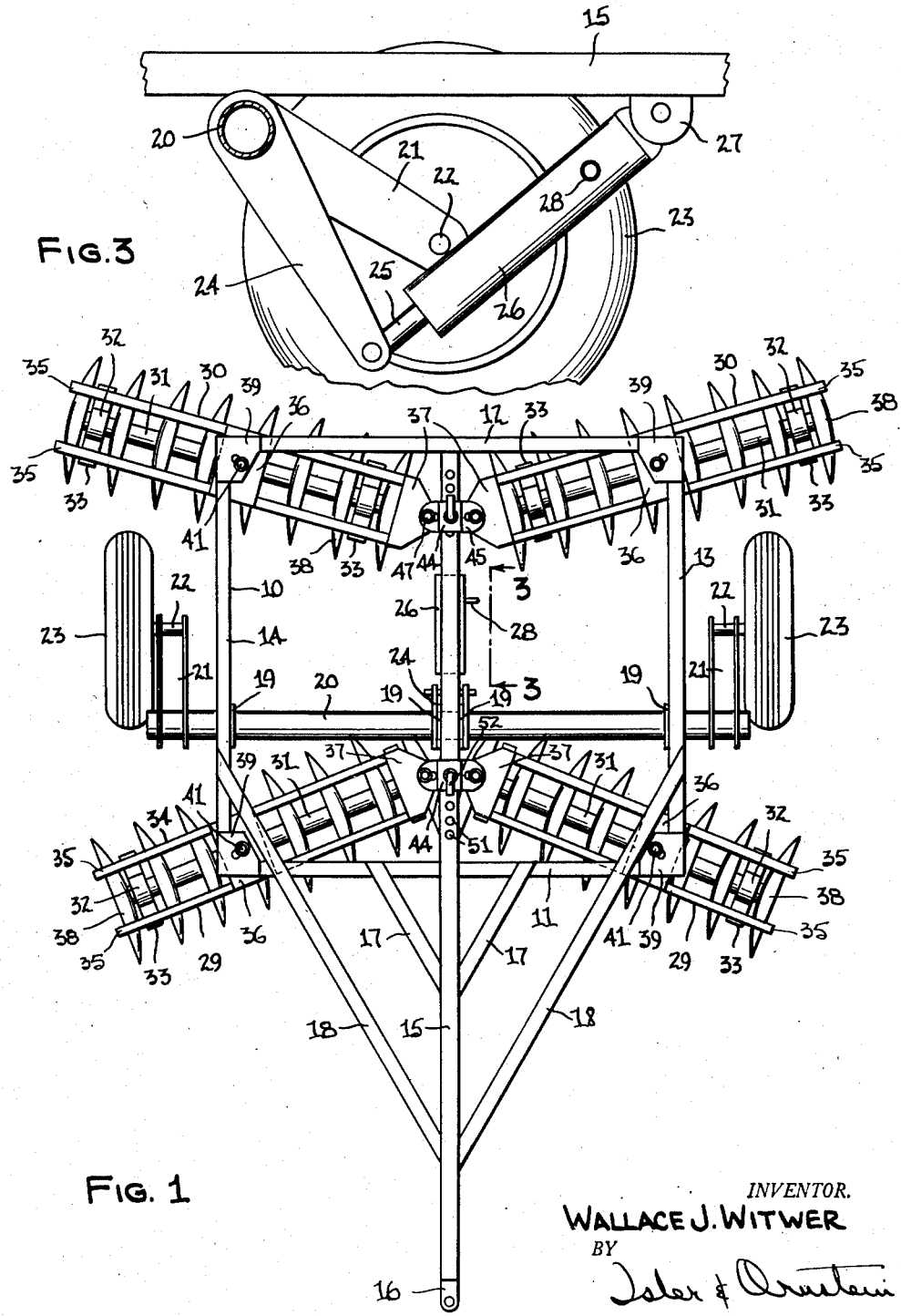
Figure 2:
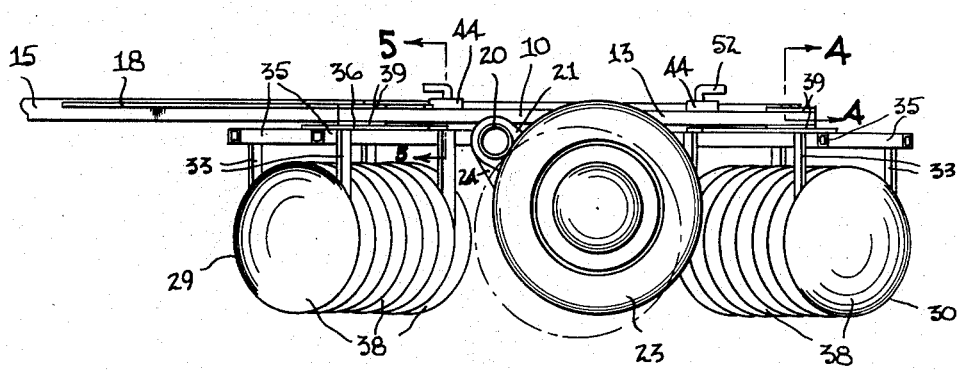
Fig. 2 is a side elevation of the plow shown in Fig. 1.

Referring more particularly to Figs. 1, 2 and 3 of the drawings, the device is seen to comprise a welded rectangular frame 10, 11, 12, 13 and 14. Secured to the members 11 and 12 as by welding, and traversing the frame is a drawbar 15 which projects well beyond the member 11 and has a suitable tongue 16 at its free end for connection to a prime mover such as a tractor.

Suitable reinforcing members 17 and 18 are secured, as by welding, to the frame 10 and the drawbar 16, so as to properly distribute the stresses placed upon the frame structure.

Apertured plates 19 are secured in alignment on opposite sides of the drawbar 15 and on each of the members 13 and 14 to support a rotatable tubular shaft 20 which is journalled in the plates, and which projects beyond the side members 13 and 14. To each end of shaft 20 is fixedly secured a lever arm 21 which extends angularly downward relatively to the horizontal frame members. A stub shaft or spindle 22 is secured to the free end of lever arm 21 and has mounted thereon a rubber-tired wheel 23.

Rigidly secured to the shaft 20 medianly thereof, so as to underlie the drawbar 15, is a bifurcated lever arm 24 which also extends angularly downward relatively to the horizontal frame members. The free end of the lever arm 24 is connected to the piston rod 25 of a hydraulic cylinder 26 which is secured to a bracket 27 on the underside of drawbar 15.

A suitable hose connection 28 is provided from the pressure source to the cylinder 26.

As best seen in Figs. 2 and 3, it will be apparent that the frame 10 can be raised or lowered in response to rotation of shaft 20 actuated by lever arm 24 through piston rod 25, which causes wheels 23 to be raised or lowered. Further reference to this elevating or lifting structure will be made hereinafter.

Suspended from the frame 10 are four gangs of disks arranged in pairs in tandem. The front gangs 29 are mounted to form an acute work angle, whereas the rear gangs 30 form an obtuse work angle. Each disk gang consists of a rod or shaft 31, which is rotatably journalled in horizontally-spaced bearing blocks 32. The bearing blocks are supported by vertically extending elements 33 which are secured to the carriage 34 of the gang.

The carriage 34 consists of two parallel box members 35 to which are secured, as by welding, a bearing plate 36 and connector plate 37 in horizontally-spaced relationship; the connector plate being across one end of the member 35 and the bearing plate being intermediate the ends of members 35, for a purpose which will be described.

Fixedly secured to the shaft 31 are a plurality of horizontally-spaced disk blades 38 which are free to rotate upon contact with the ground.

Figure 4:
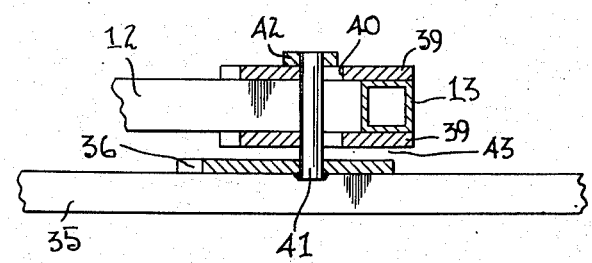
Fig. 4 is a fragmentary cross-sectional view taken on line 4—4 of Fig. 2 showing details of the mounting structure for the gang assemblies.
Figure 5:
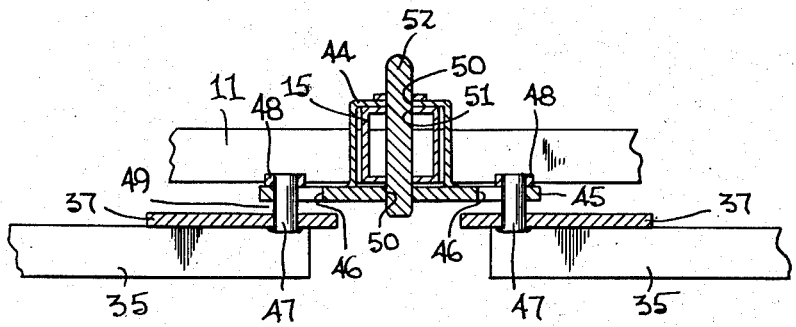
Fig. 5 is a fragmentary cross-sectional view taken on line 5—5 of Fig. 2 showing further details of the mounting structure.

As best seen in Figs. 4 and 5, each corner of the rectangular frame 10 has secured thereto a pair of gusset plates 39 which are welded to the frame and which are each provided with a slot 40.

Rigidly secured to each bearing plate 36 of the disk gangs 29 and 30 is a vertically extending pivot pin 41 which projects through the diagonally extending slots 40 in the plates 39 and extends slightly beyond the uppermost of the pairs of plates. A releasable collar 42 surmounts each pivot pin 41 and prevents withdrawal of the pin from the plates 39. The pin 41 is of such predetermined length as to allow a clearance space 43 between the bearing plate 36 and the lowermost gusset plate 39 when the collar 42 is resting on the top plate 39. Thus, it will be apparent that this connection permits both vertical and lateral movement of the gangs relatively to the frame.

A pair of saddle members 44 are mounted slidably on the drawbar 15, each saddle member being movable longitudinally of the drawbar.

The saddles have laterally extending ears 45 having elongated slots 46 therein. Through each ear 45 projects a pivot pin 47 which is secured, as by welding, to each of the connector plates 37. The pin 47 is surmounted by a releasable collar 48 which prevents withdrawal of the pin from the ear 45.

The pin 47 is of such length as to provide a clearance 49 between plate 57 and ear 45 when the collar 48 is resting on the ear. Thus, this connection of the gang to the frame likewise permits both vertical and lateral movement of the gangs.

Each saddle member 44 is apertured as at 50 and the drawbar 15 is provided with longitudinally-spaced openings 51 which can be selectively aligned with openings 50 by slidably moving the saddles. By thrusting a locking rod 52 through the aligned openings the angularity of the disk gangs can be fixed and maintained at any one of several positions. It will be noted that each pair of gangs 29 or 30 is independently adjustable and that such adjustment can be accomplished quickly and easily by a sliding movement of the saddle members 44.

In utilizing the disk plow, the drawbar 15 is connected to a prime mover such as a tractor and the cylinder 26 is connected to a pressure source on the tractor through the hose 28.

In transporting the plow to the area to be worked, the wheels 23 are lowered by the operator by actuation of the piston rod 25, causing the disk gangs to be elevated above ground level as indicated in dotted outline in Fig. 2.

When the work area is reached, the pressure on cylinder 26 is relieved permitting the disk gangs 29, 30 to engage the ground and perform the desired work. The lowermost gusset plates 39 then rest upon the bearing plates 36 thus stabilizing the frame and the gangs.

Should any of the disks 38 encounter a concealed obstruction, such as a large rock, the floating mounting of the disk gang will permit the gang to yield and cushion the shock, instead of breaking as heretofore mentioned.

When it is desired to adjust the angularity of a pair of gangs 29 or 30, the wheels 23 are lowered to the dotted line position of Fig. 2, thus elevating the disks. The locking rod 52 is then withdrawn and the saddle 44 can easily be moved manually along the drawbar 15 to adjust the angularity of a pair of gangs. No tools are required.

Figure 6:
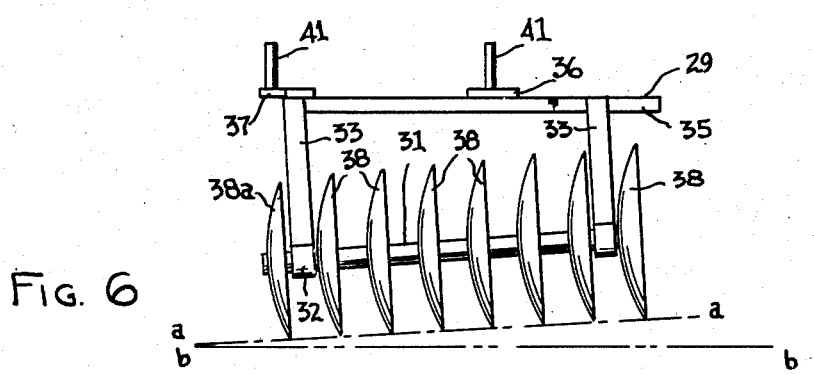
Fig. 6 is a fragmentary view in elevation of one of the disk gangs, showing the manner of elevating the disks relatively to each other for uniformity of depth penetration.

In Fig. 6, I have shown a preferred form of disk gang arrangement which, I have found, overcomes some of the difficulty which has heretofore existed in obtaining uniformity of action in the disk blades 38 of the gangs.

As is shown in Fig. 1, the innermost disks 38 of each of the front gangs 29 are in close proximity to each other, as is customary in the art. These innermost disks may be only one or two inches apart at their closest points, whereas the remainder of the disks 38 on the gang are uniformly spaced axially from each other in increments of about six inches or more. The fact that these innermost or adjacent disks, which I have designated 38a in Fig. 6, operate in opposition to each other in such close proximity, causes these blades 38a to be subject to greater ground resistance than the other, more widely-spaced, blades 38. There is therefore a strong tendency for the blades 38a to raise or lift themselves, thus resulting in a non-uniform depth of cut.

As shown in Fig. 6, I have found that if the innermost disks 38a are arranged on the gangs so as to be at a lower elevation than the other disks 38, that the net effect is to obtain a more effective disking operation. Therefore, as indicated by the line a—a, I suspend the disks from the gang frame in a manner such that the innermost disk 38a is the lowermost of the gang, and preferably the remaining disks 38 are each at a progressively greater elevation from the ground line b—b. In operation, this arrangement of the disks will compensate for the increased ground resistance which is encountered by disks 38a and will result in a uniform depth of penetration. For best results, I have found that the disk 38a should be lower than the outermost disk 38 by an amount equal to one-sixth to one-eighth the diameter of the disks 38.

Figure 7:
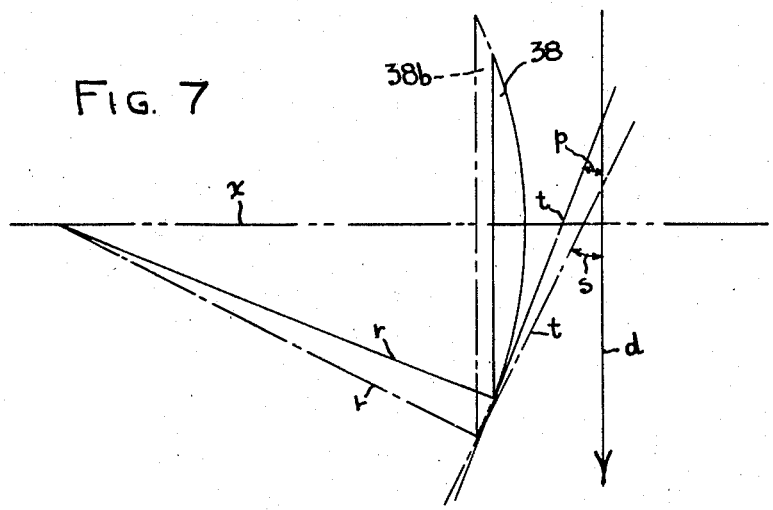
Fig. 7 is a diagrammatic view of a disk blade showing the relationship of disk angularity to maximum cutting depth.

In Fig. 7 I have illustrated the relationship which I have found exists between the angularity of the disk gangs and the maximum depth of penetration of the disks. The reference character 38 designates one of the disks of the gang 29 as it appears when viewed from above, as in Fig. 1. For purposes of illustration, the disk 38 may be said to have a radius of curvature $r$ of 22¼ inches and a diameter of 16 inches. As a means of comparison, the broken-line outline indicates a disk 38b which is superimposed upon the illustration of the disk 38. The disk 38b has the same radius of curvature $r$ as the disk 38, but is lager in diameter, say 18 inches.

The disks are shown positioned normal to the line of draft $d$ of the implement, that is, the axis of rotation $x$ of the disks is perpendicular to the direction of travel of the implement.

The radius $r$ is drawn to intersect the disk 38 on the leading edge thereof. The line $t$ is then drawn normal to $r$ at the point of intersection, and the line $t$ therefore is tangent to the disk 38 at its leading edge. The tangent $t$ forms an acute angle $p$ with the line of draft $d$.

I have found that the maximum depth penetration of a disk blade will occur under conditions where the tangent $t$ is parallel to the line of draft $d$. Thus, if the disk 38 is repositioned by rotating it counter-clockwise $p$ degrees, the line $t$ will be parallel to line $d$ and optimum depth penetration will result.

It will be observed that, similarly, the larger disk blade 38b has a comparable tangent line $t$ which forms the angle $s$ at its intersection with the line $d$. The angle $s$ is larger than angle $p$. Thus, the 18 inch disk 38b should be angled $s$ degrees to obtain maximum depth penetration.

Accordingly, by utilizing the above teaching, it is possible to establish a critical angularity for maximum depth penetration for any specific disk gang assembly. In constructing a disk harrow of the type herein described, I can thus establish or position one of each of the series of openings 51 to establish this critical angularity for the disk gangs 29 and 30. Although it is not absolutely necessary, it is preferable that such opening 51 be the same opening that limits the maximum degree of angularity to which the gangs can be adjusted.

Although I have referred throughout this description to a disk harrow, the mounting which I have described is readily adaptable to use in connection with various forms of tillage tools such as pulverizer wheels, rotary hoes, spring tooth harrows or cultivators, and various combinations of such tools. This flexibility or versatility of the mounting is one of its salient features and advantages. By loosening or removing the collars 42 and 48 from the pivot pins 41 and 47, any selected gang of disks 29 or 30 are freed from the rectangular frame 10, so that when the frame 10 is elevated, as by wheels 23, the freed gangs drop out. While the frame 10 is thus elevated, another gang of tillage tools can be placed in position under the frame. Then the frame is lowered and the collars 42 are resecured. Thus a minimum of time and effort is required to interchange the gangs of tools or to adjust the angularity of the gangs.

It will also be noted that by locating the cylinder 26 below frame level, a wagon body or flat bed can be mounted on the frame 10, if desired.

Figure 8:
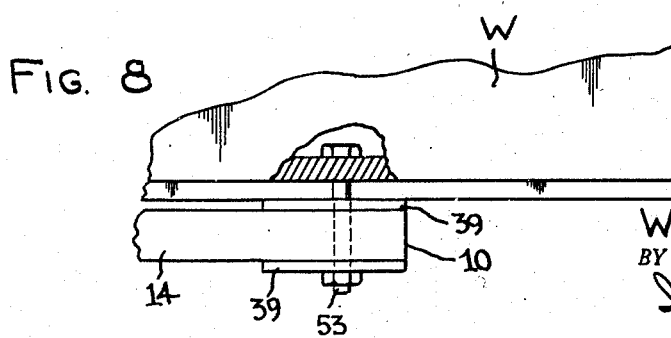
Fig. 8 is a fragmentary view showing the manner of mounting a wagon body on the implement frame.

The wagon body W is mounted on the frame 10 and can be secured to the frame through use of the openings 40 after the tillage tools have been removed. The implement may thus be used as a cargo carrier which can conveniently be raised or lowered for loading purposes by means of the wheels 23. In Fig. 8 is shown a fragmentary view of the implement disclosing the manner of mounting the wagon frame thereon, utilizing bolts 53.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

This application is a continuation-in-part of my copending application, Serial No. 258,384, filed Nov. 27, 1951, now forfeited, for "Mounting for Rigid Disk Assembly."

Having thus described my invention, I claim:

1. In a harrow, a wheel mounted substantially rectangular vertically adjustable rigid frame having a longitudinally extending drawbar positioned between the side members of said frame, a plurality of rigid gang disks suspended from the corners of the frame, gusset plates on each corner of the frame having slots therein, a bearing plate medially positioned at the top of each gang, a vertical pivot pin connecting the bearing plate and gusset plates for each gang extending through said slots to permit a predetermined amount of free vertical and lateral movement at the suspension connections, a slidable connection on the drawbar, a connector plate at the inner end of each gang, ears on the slidable connector overlying the connector plates of adjacent pairs of gangs, said ears having slots therethrough, and a vertical pivot pin connecting said overlapped plates and ears and extending through the slots to permit a predetermined amount of free vertical and lateral movement between these parts.

2. In an agricultural implement, the combination of a rigid rectangular frame, a longitudinally extending drawbar fixedly secured to the front and rear members of said frame, a flat horizontal gusset plate fixedly secured to each corner of said frame and having a diagonally extending slot therein, a gang of soil tillage tools pivotally suspended from each corner of said frame, each of said gangs having a flat horizontal bearing plate fixedly secured thereto and engageable in face-to-face relationship with said gusset plate, a pivot pin secured to said bearing plate and extending freely through said slot whereby each of said gangs has a predetermined degree of free vertical and lateral movement relatively to the frame, a movable connector element slidably secured to said drawbar adjacent the inner ends of each pair of said gangs, a pair of oppositely disposed laterally extending ears provided on said connector element, a flat horizontal connector plate fixedly secured to the inner end of each gang and engageable in face-to-face relationship with said ears, a pivot pin rotatably connecting said connector plate and said ear, and means for releasably securing said connector elements in selected positions on said drawbar to effect angular adjustment of said gangs.

3. In an agricultural implement, the combination of a rigid rectangular frame, a longitudinally extending drawbar fixedly secured to the front and rear members of said frame, a flat horizontal bearing surface provided on each corner of said frame, said bearing surface having a diagonally extending slot therein, a gang of tillage tools pivotally secured to each corner of said frame, each gang having a flat horizontal bearing plate fixedly secured thereto and engageable in face-to-face relationship with said bearing surface, a pivot pin secured to said bearing plate and extending freely through said slot whereby each of said gangs has a predetermined degree of free vertical tilting movement and free horizontal linear movement relatively to said frame, a movable connector element slidably secured to said drawbar adjacent the inner ends of each pair of said gangs, a slotted laterally extending ear provided on said connector element adjacent each of said gangs, a flat horizontal connector plate secured to the inner end of each of said gangs and engageable in face-to-face relationship with said ear, a second pivot pin secured to said connector plate and extending freely through said slot in said ear whereby said connector plate has a predetermined degree of free vertical and lateral movement relatively to said ear, and means for releasably locking said connector elements in selected positions on said drawbar to effect angular adjustment of said gangs.

4. In an agricultural implement, the combination of a rigid rectangular frame, a longitudinally extending drawbar element fixedly secured to the front and rear members of said frame, a gang of tillage tools pivotally suspended from each corner of said frame, a movable connector element slidably secured to said drawbar element for axial movement thereon and pivotally connected to the adjacent ends of each pair of gangs, a slotted flat horizontal bearing surface provided on each corner of said frame in overlying relationship to each of said gangs, a slotted flat horizontal bearing surface provided on said connector element in overlying relationship to the adjacent ends of each pair of gangs, a flat horizontal bearing plate secured to each of said gangs and engageable in face-to-face relationship with each of said bearing surfaces to normally maintain said gangs in stabilized working relationship to the ground, and a pivot pin secured to each of said bearing plates and extending slidably through each of said slotted bearing surfaces whereby each of said gangs has a predetermined degree of free vertical and lateral movement relatively to said frame.

5. In an agricultural implement, the combination of a rigid rectangular frame, a longitudinally extending drawbar element fixedly secured to the front and rear members of said frame medianly thereof, a connector element slidably secured to said drawbar element for axial movement thereon, a slotted flat horizontal bearing surface provided on each corner of said frame, a slotted flat horizontal bearing surface provided on said connector element, a gang of tillage tools pivotally secured to each corner of said frame, the adjacent ends of each pair of said gangs being pivotally secured to said connector element, a flat horizontal bearing plate secured to each of said gangs and engageable in face-to-face relationship with each of said bearing surfaces to normally maintain each of said gangs in stabilized working relationship to the ground, a vertical pivot pin secured to each of said bearing plates and projecting slidably through each of said slotted bearing surfaces whereby each of said gangs has a predetermined degree of free vertical and lateral movement relatively to said frame, and means for releasably locking said connector element in selected positions on said drawbar to effect angular adjustment of said gangs.

6. In an agricultural implement, the combination of a rigid rectangular frame, a longitudinally extending drawbar element fixedly secured to the front and rear members of said frame medianly thereof, a connector element slidably secured to said drawbar element for axial movement thereon, a slotted flat horizontal bearing surface provided on each corner of said frame, a slotted flat horizontal bearing surface provided on said connector element, a gang of tillage tools pivotally secured to each corner of said frame, the adjacent ends of each pair of said gangs being pivotally secured to said connector element, a flat horizontal bearing plate secured to each of said gangs and engageable in face-to-face relationship with each of said bearing surfaces to normally maintain each of said gangs in stabilized working relationship to the ground, a vertical pivot pin secured to each of said bearing plates and projecting slidably through each of said sloted bearing surfaces whereby each of said gangs has a predetermined degree of free vertical and lateral movement relatively to said frame, means for releasably locking said connector element in selected positions on said drawbar to effect angular adjustment of said gangs, ground-engaging wheels secured to said frame, and means for adjusting the level of said frame relatively to said wheels.

7. In an agricultural implement, the combination of a rigid rectangular frame, a longitudinally extending drawbar fixedly secured to said frame medianly thereof, a plurality of gangs of tillage tools, a bearing plate positioned at the top of each gang and engageable in face-to-face relationship with said frame, connecting means pivotally and slidably securing each gang adjacent a corner of said frame for limited universal movement relatively to said frame, a connector element slidably secured to said drawbar intermediate the adjacent ends of each pair of said gangs, a second bearing plate positioned at the top of each gang and engageable in face-to-face relationship with said connector element, second connecting means pivotally and slidably securing each gang to said connector element for limited universal movement relatively thereto, ground-engaging wheels supporting said frame, and actuating means carried by said frame and operatively connected to said wheels to raise and lower the same.

8. In an agricultural implement, the combination of a rigid rectangular frame, a longitudinally-extending drawbar fixedly secured to said frame medianly thereof, a pair of gangs of tillage tools, a bearing plate provided at the top of each of said gangs and engageable in face-to-face relationship with said frame, means pivotally and slidably securing each of said gangs adjacent a corner of said frame for limited universal movement relatively to said frame, a connector element slidably secured to said drawbar intermediate the adjacent ends of said pair of gangs, a second bearing plate provided at the top of each gang and engageable in face-to-face relationship with said said connector element, connecting means pivotally securing each of said gangs to said connector element for movement therewith, ground-engaging wheels carried by said frame, and actuating means carried by said frame and operatively connected to said wheels to raise and lower the same.

References Cited in the file of this patent
UNITED STATES PATENTS

| | | |
|---|---|---|
| 1,147,281 | Trissel | July 20, 1915 |
| 1,162,332 | Buchanan et al. | Nov. 30, 1915 |
| 1,370,774 | Abernathy | Mar. 8, 1921 |
| 1,380,441 | Truman | June 7, 1921 |
| 1,762,633 | Johnson et al. | June 10, 1930 |
| 2,587,494 | Love | Feb. 26, 1952 |
| 2,606,414 | Dyrr | Aug. 12, 1952 |
| 2,683,960 | Love | July 20, 1954 |

OTHER REFERENCES

Agricultural Engineering, pages 215, 216 and 217, June 1939.